No. 709,362. Patented Sept. 16, 1902.
A. C. SCHUMAN.
CALCULATING MACHINE.
(Application filed Dec. 18, 1901.)
(No Model.) 7 Sheets—Sheet 1.

No. 709,362. Patented Sept. 16, 1902.
A. C. SCHUMAN.
CALCULATING MACHINE.
(Application filed Dec. 18, 1901.)

(No Model.) 7 Sheets—Sheet 2.

No. 709,362. Patented Sept. 16, 1902.
A. C. SCHUMAN.
CALCULATING MACHINE.
(Application filed Dec. 18, 1901.)
(No Model.) 7 Sheets—Sheet 4.

No. 709,362. Patented Sept. 16, 1902.
A. C. SCHUMAN.
CALCULATING MACHINE.
(Application filed Dec. 18, 1901.)
(No Model.) 7 Sheets—Sheet 5.

No. 709,362. Patented Sept. 16, 1902.
A. C. SCHUMAN.
CALCULATING MACHINE.
(Application filed Dec. 18, 1901.)

(No Model.) 7 Sheets—Sheet 7.

WITNESSES:
INVENTOR
Alexander C. Schuman
BY
Attorneys

UNITED STATES PATENT OFFICE.

ALEXANDER C. SCHUMAN, OF LOUISVILLE, KENTUCKY, ASSIGNOR TO SPALDING COLEMAN, OF LOUISVILLE, KENTUCKY.

CALCULATING-MACHINE.

SPECIFICATION forming part of Letters Patent No. 709,362, dated September 16, 1902.

Application filed December 18, 1901. Serial No. 86,455. (No model.)

*To all whom it may concern:*

Be it known that I, ALEXANDER C. SCHUMAN, a citizen of the United States, residing at Louisville, in the county of Jefferson and State of Kentucky, have invented a certain new and useful Improvement in Calculating-Machines, of which the following is a full, clear, and exact description.

This invention relates to that class of machines by means of which the processes of addition, subtraction, multiplication, and division may be performed mechanically and accurately and the result duly recorded, and it is an improvement upon the machine shown in my application filed December 19, 1901, Serial No. 86,514.

The invention comprises setting mechanism, registering mechanism, and recording or printing mechanism, all so combined and arranged that when certain keys corresponding to the number of the sum to be done are actuated by the operator the several mechanisms are thereby automatically so arranged that they can be properly set in motion by a manually-operated device, such as a crank, and the registering and printing properly effected.

The several mechanisms of the machine are contained within a suitable casing, which may be of any desired kind and finish. In the drawings I have merely illustrated supports for the various mechanisms. The "setting mechanism" comprises finger-operated keys which when depressed will arrange stops to limit the movements of vibrating levers which are released by the depression of the keys. The machine is provided with a row of nine keys, one for units, another for tens, and so on for each denomination, as is customary, and for each row of keys there are a corresponding registering wheel or disk and a vibrating lever and connections, the lever being limited in its movement by the position of the key depressed and being positively returned to normal position by manually-operated devices, hereinafter described, and during its return the registering-disk is actuated and caused to effect the proper registration of the number indicated on the depressed key. The vibrating lever, moreover, is connected with and controls the setting of a type-carrier in the printing mechanism, so that each time the lever is released the proper type will be presented at the printing-point, and a record may be taken therefrom, if desired. The construction, connections, and modes of operation of the several parts will be hereinafter more particularly described, with reference to the accompanying drawings, forming part of this application, and which illustrate the best form of the invention now known to me.

Having thus briefly stated the nature of my invention, I will proceed to describe the same, referring to the claims for concise summaries of the novel features and combinations of parts which I claim as my present invention and desire to secure by Letters Patent thereon.

In the accompanying drawings, illustrating my invention, Fig. 18 is a detail view of the arm 99 detached. Fig. 19 is a detail side view of three levers 10 and immediate connections, showing the "dwell" thereof. Fig. 20 is a detail view of the devices for operating the type-hammer setting and releasing bar from the main shaft 19. Fig. 21 is a detail view showing the springs for actuating levers 10. Figs. 22 and 23 are detail views showing different relative positions of the catch-pins 17 on levers 10 and the hooks 14ª on levers 5. Fig. 24 is a detail view showing the extra tooth 36 on segments 22 retracted, spring 37 being a pushing or expanding spring. Fig. 25 is a detail view showing the several devices controlled by the setting-key 75 and the connections of said key. Fig. 26 is a detail view showing the selecting-slide 97 and connections. Fig. 27 is a detail rear view of several registering-wheels and the carry-over devices. Figs. 28 and 29 are front and rear views showing the devices for catching and releasing the arms 39 of the carry-over devices.

Figures 1, 14, 15:
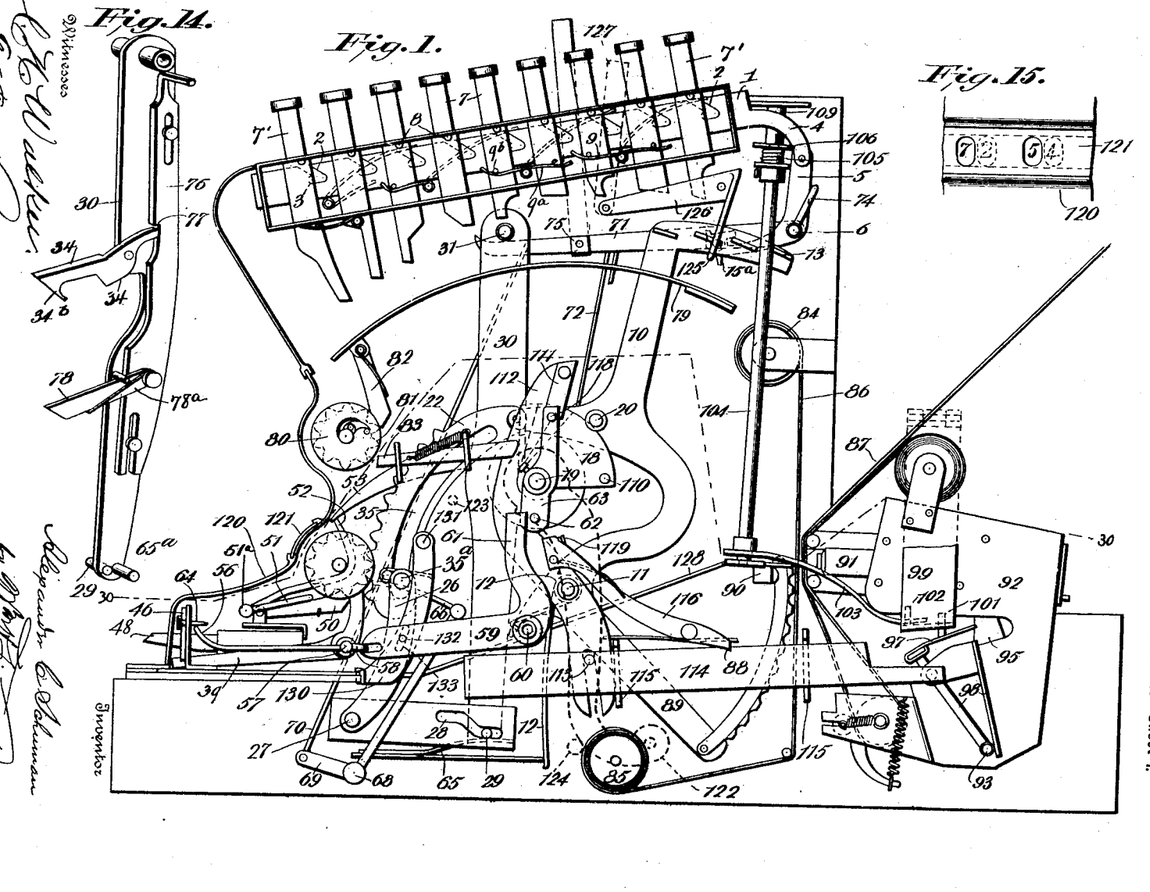
Figure 1 is a side elevation of that side of the machine upon which the operating-crank is arranged, with the outside casing removed and the parts being shown in the position of rest.
Fig. 14 is a perspective view of the register-wheel-frame controlling-lever and its adjuncts.
Fig. 15 is a detail view showing the arrangement of the indicator or sight openings.
Figures 2, 16, 17:
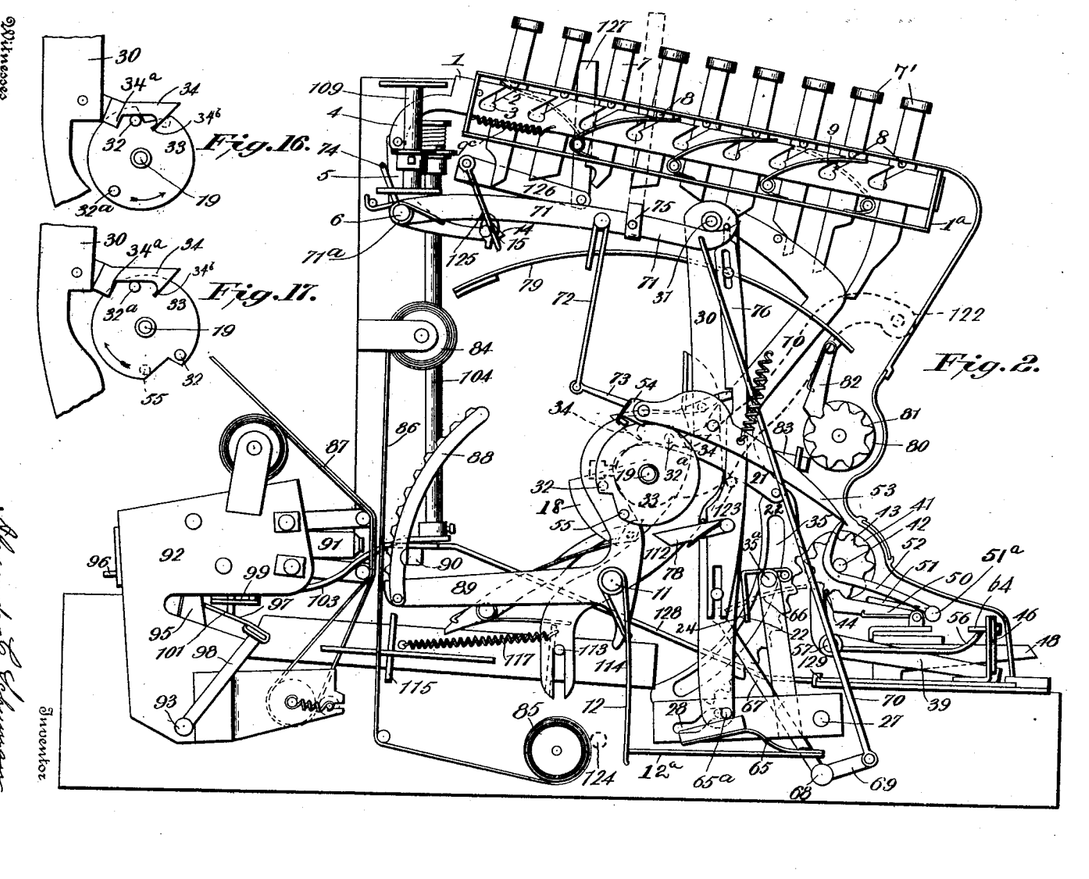
Fig. 2 is a side elevation of the opposite side of the machine, the casing also being removed and showing the parts in position ready to effect the registration and recording.
Fig. 16 is a detail view of the disk 33 and lever 130 in the position of rest, as in Fig. 1.
Fig. 17 is a similar view of the same parts in the position assumed when the mechanism is set, as in Fig. 2.

*The keyboard and connections for setting the parts preparatory to effecting a registration.*—At the front and top of the machine are a number of rows of keys 7', having stems 7, which depend through suitable guides. Beside each row of key-stems is a sliding bar 1, having nine obliquely-disposed notches 2, having offsets 3 at their lower ends. Each bar 1 has an extension 4, which is connected by a pin-and-slot joint with the upper end of a bent lever 5, mounted loosely upon a transverse shaft 6. Each key-stem 7 has a laterally-projecting pin 8, engaging the adjacent notch 2 in the relative sliding bar and effecting the longitudinal movement of that particular bar when the key is depressed, and this movement of the bar rocks the connected lever 5 and causes the latter to release the corresponding main vibrating setting-lever 10, to be described. The keys 7' are normally uplifted by springs, which are shown in Fig. 2 as coiled springs 9, having one free end acting against the bottom of the casing 1ª, in which bars 1 are contained, and another end against the pins 8. As shown in Fig. 1, springs 9ª act against pins 9ᵇ on the stems to lift them. I do not consider the arrangement of springs material. The bars 1 are returned to normal position by springs 9ᶜ, as indicated in Fig. 2. When a stem 7 is depressed, its pin 8 coöperates with slot 2 in bar 1, causing said bar to travel forwardly against the tension of spring 9ᶜ, and when the key-stem is fully depressed spring 9ᶜ pulls bar 1 rearwardly until offset 3 is engaged by pin 8, thus locking the key-stem in depressed position, and as the rearward movement of bar 1 is less than the forward travel (owing to the offset 3 being short) the bar 1 will be held in such position that the pins 8 of the other key-stems in this row cannot enter slots 2, and consequently said keys are locked in their raised position until the depressed key is released. This release is effected by pushing bar 1 forward until offset 3 disengages pin 8, when the key-stem will be lifted by its spring and spring 9ᶜ of bar will restore the latter to its normal position. The bar 1 is automatically pushed forward after the registering and recording operations have been effected by the return movement of the main vibrating setting-lever 10, as hereinafter explained, there being one such lever 10 for every row of setting-keys, and as all levers 10 are substantially alike the description of one will suffice for all. The several vibrating levers 10 are arranged upon a transverse shaft 11 and are normally impelled toward the front of the machine by means of springs 12, coiled on said shaft and engaging a fixed part 12ª of the frame at one end and a projection on the lever 10 at the other end, as shown in Fig. 2. The upper portion of each lever 10 (see Fig. 7) is provided with a rearwardly-extending arm 10ª, having laterally-projecting lugs 13, arranged in different distances from the pivot of the lever and respectively adapted to come into contact with the appropriately-shaped lower end of the key-stems 7 of the related row of keys when such keys are depressed to control the extent of vibration of lever 10 and the proper location of the connected actuating-segment 22 with relation to the relative registering-disk, as hereinafter explained, so that said disk may be thereafter moved the number of teeth corresponding to the number on the key depressed. By this arrangement of lugs keys 7' may be properly arranged and the throw of the levers 10 reduced.

Figure 30:
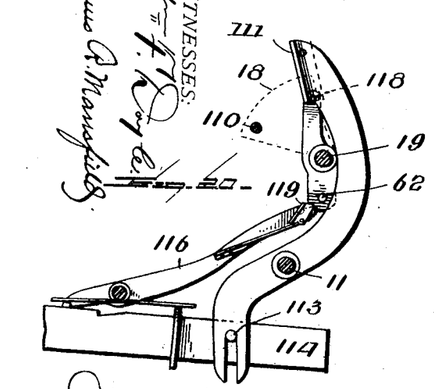
Fig. 30 is a horizontal sectional view of the machine on line 30 30, Fig. 1.
Figure 31:
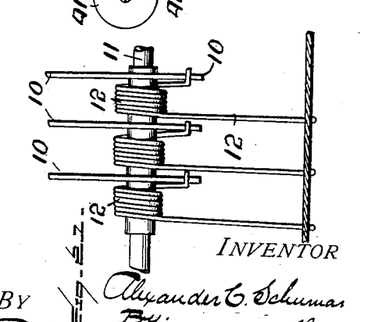

Pivoted loosely to and suspended from a forwardly-projecting arm 21 on the vibrating lever 10 is a toothed segment 22, having teeth to engage the teeth of a gear 43 on the related registering-disk 41. (See Fig. 5.) The segments 22 are guided in their vertical movements in slots 23 in a plate 24, which is supported upon vibrating arms 26 and 26', the latter being connected to a tilting bar 25, arm 26 and bar 25 both being connected to a rock-shaft 27, suitably journaled in the frame. The bar 25 has a cam-slot 28 in its free end engaged by a pin 29 on the end of a swinging lever 30, which is pivoted upon a stud 31, and its lower end can be swung relatively to the cam-slot 28 by means of a pin 32, projecting laterally from a disk 33, fast on the main actuating rock-shaft 19. (See Figs. 2 and 30.) When the pin 32 engages the heel 34ª of a latch 34, (see Fig. 16,) pivoted to the lever 30, it swings lever 30 forwardly, causing the pin 29 to ride up the cam-slot 28 and depress the rear end of the bar 25, and so rock shaft 27 and cause it to move plate 24 and the segments 22 away from the registering-wheels, as in Fig. 2. This movement occurs simultaneously with the forward or setting movement of the main shaft 19, as hereinafter explained. As the main shaft 19 turns in completing the upward or setting movement of the handle 122 the disk 33 continues to revolve, and a second pin 32ª thereon comes behind the toe 34ᵇ of the latch 34. (See Fig. 17.) Thereafter upon the return movement of shaft 19 (indicated in Fig. 17) the pin 32ª engages the toe 34ᵇ of the latch 34 and causes it to swing lever 30 and draw the pin 29 from the higher to the lower level of the cam-slot 28, and so elevates the rear end of the bar 25, thereby rocking shaft 27 and plate 24 toward the indicator and throwing the segment 22 of the levers 10 into engagement with the gear of their appropriate registering-disks 41. If a key has been depressed, thus setting a lever 10, the segment 22 of such lever will be thrown into engagement with the gear of its appropriate registering-disk at the tooth corresponding in number with the number of the depressed key, and during the return movement of the main shaft 19 the segment is actuated and turns the registering-disk as many teeth from "0" to "9" as such lever 10 had been set for. The segments may be slidably engaged with the plate 24 in any suitable way so as to swing therewith, as by longitudinal slots 35, embracing a cross-bar 35$^a$ of the carrier.

The slot 28 in bar 25 has an upper and a lower horizontal portion connected by an inclined portion and serves to lock the plate 24 in both its forward and rearward positions.

It should be noted that each vibrating lever 10 is locked in its normal position by the catch-lever 5 until the latter is disengaged therefrom by the depression of one of the relative key-stems and the consequent longitudinal shifting movement of the related slide 1.

Figures 7, 8, 9, 10, 11, 12, 13:
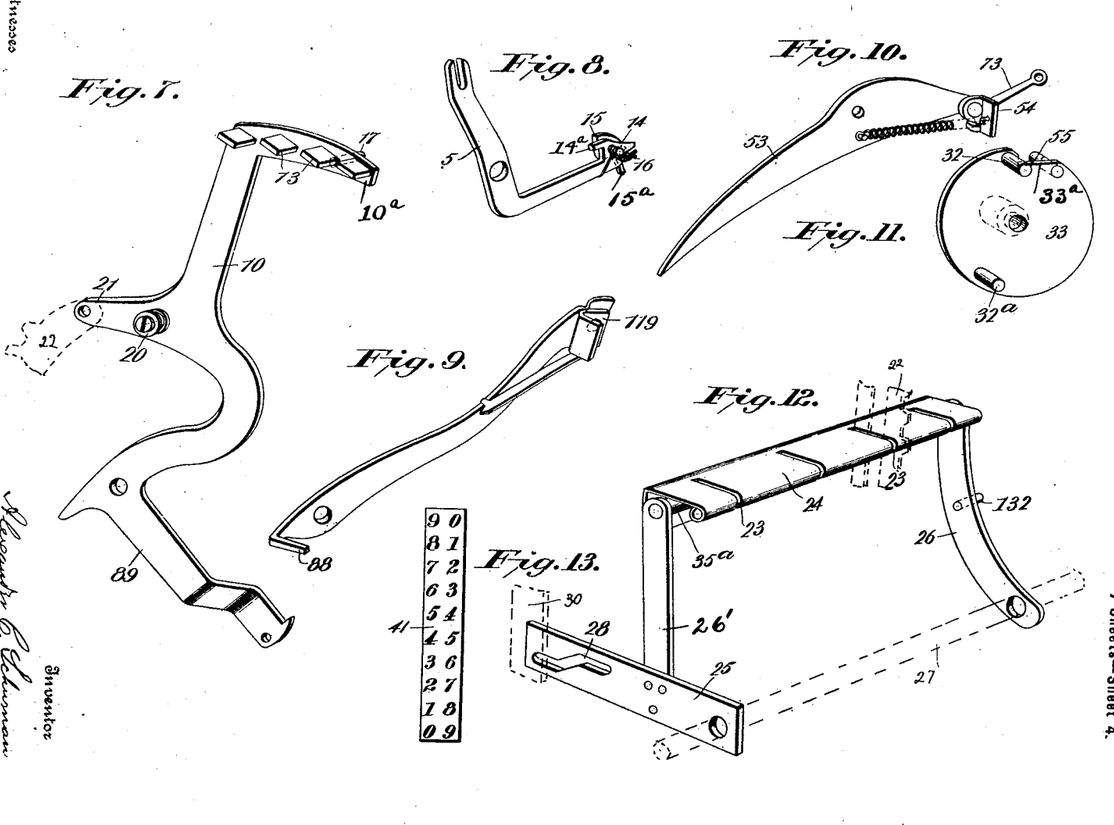
Fig. 13 is a development of one of the indicator-drums, showing the series of reversed numerals.

As shown more particularly in Fig. 8, each catch-lever 5 is provided with a hook end 14$^a$, on which is pivoted a spring-pressed tumbling-latch 15, projecting above the hook 14 and limited in its forward movement by a pin 16, engaging the under side of hook end 14 of lever 5. The main vibrating lever 10 is provided with a laterally-projecting pin 17, which when the lever 10 is in its normal inactive position lies behind the hook end 14 of the lever 5, whereby lever 10 is restrained from active operation until said hook 14$^a$ is lowered by the rocking of lever 5, caused by the depression of a key-stem and the forwardly sliding of bar 1, by which movement the hook end of lever 5 is depressed below the said pin 17, and then the said pin can ride over the tumbling-latch 15 until the forward movement of lever 10 is arrested by one of its lugs 13 coming into contact with the lower end of the depressed key-stem. As the vibrating lever 10 is returned to its normal position pin 17 contacts with the tumbling-latch 15 on hook end 14 of catch-lever 5, and as the latch cannot then yield pin 17 forces the latch 15 and end 14 of said catch-lever downwardly, and by reason of the connection between the vertical arm of lever 5 and the bar 1 the latter is pushed forward until the depressed key-stem is released, as before described.

It will be observed that the pin 17 on lever 10 when the latter is in normal position lies back of the hook end 14 on catch-lever 5, but will engage the latter after making a slight forward movement. This movement is utilized for the carry-over operations, as described in my aforesaid application, and occurs whether any related key-stem has been depressed or not; but if no key-stem has been depressed the pin 17 will engage under the hook 14$^a$, and thus will lock the catch-lever 5, so that no key in its related row can be depressed until the levers 10 have been returned to normal position. This hook 14$^a$ is not indispensable, but is useful to prevent the operator setting any of the keys after he has started to rock the main shaft to put the mechanisms through their cycle of operations until such cycle has been completed and the parts all restored to normal position.

*The setting operation.*—When a key has been depressed and its corresponding vibrating lever 10 released, as above described, the latter is still prevented from moving forward until the main shaft 19 is rocked forwardly, (in the direction indicated by the arrow on Fig. 19,) because said shaft 19 carries cams 18, (one for each lever 10,) which engage with pins or rollers 20 on the respective levers 10, and while said cams are intended to positively return the levers 10 to normal position they prevent the springs 12 throwing the levers 10 forwardly until the cams are withdrawn or eased therefrom.

The wiper-cams 18 are preferably segmental and are fixed on the shaft one slightly in advance of the other, so that they will "pick up" the levers 10 successively, beginning with that of lowest denomination, so that upon the return movement of shaft 19 the levers 10 will be brought back to normal position in one, two, three order, affording time for the "carry-over" operations, hereinafter explained. On the forward or "setting" movement of shaft 19 the cams 18 draw away from rollers 20, leaving the levers 10 under the control of springs 12, which throw levers 10 forwardly until they are arrested by the catches 14$^a$ or contact with depressed key-stems, as indicated in Fig. 2.

The peripheries of cams 18 are preferably of sufficient extent to cause the cams to serve as locks to hold the levers 10 in fully-retracted position so long as shaft 19 is in normal inactive position, and thereby prevent the springs 12, through levers 10, exerting any pressure on the key bars or levers 5, and also to keep pins 17 out of engagement with hooks 14.

*The carry-over devices.*—In commercial machines there will be a number of rows of keys, a corresponding number of vibrating levers 10, coacting segments 22, and registering-wheels 41, and in order to carry over from a registering-wheel of lower denomination to the next higher denomination each segment 22 of the "tens" and higher denomination has an extra tooth 36, (see Fig. 5,) which is brought into action only when a carrying-over is to be effected.

Figures 1B, 5:
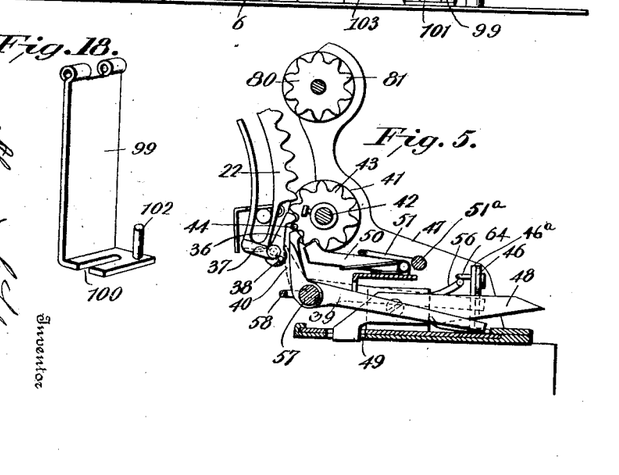
Fig. 5 is a sectional elevation of part of the registering mechanism.

Referring to Fig. 5, it will be seen that the segment 22 has a dog 36 pivoted to its lower end, said dog having a tooth on its upper free end adapted to engage the teeth of the gear 43 of the related registering-wheel, a spring 37 normally retaining the dog out of operative position, with its tooth in rear of the teeth of the segment. In Fig. 24 I have shown an expanding spring $37^e$ as a substitute for the spring 37. (Shown in Fig. 5.) A laterally-projecting pin 38 extends from the lower end of the dog 36 and is adapted to engage a wiper-cam 40 when the latter is projected into the path of the movement of the pin 38, and thereby tilt the dog forward against the tension of its spring and cause its tooth to engage and actuate the registering-disk one extra notch when the segements are returned to normal position. The wiper-cams 40 are operated as follows: The cam 40 for the tens-disk is set by and from the units-disk. The cam 40 for the hundreds-disk is set by and from the tens-disk, and so on. As shown, an arm 45 is mounted on a rock-sleeve $45^a$, journaled on a transverse shaft or support 57, parallel with the registering-disks, said arm projecting into the path of a pin 44 on the gear 43 of the units-disk. To the sleeve $45^a$, in line with the gear of the tens-disk, is attached the wiper-cam 40, which is adapted to be engaged by the pin 38 of the dog 36, carried by segment 22, engaging the tens registering-wheel. When the pin 44 engages arm 45, it rocks the sleeve $45^a$ and throws the wiper-cam 40 into operative position, and said cam is locked in such position by means of a finger 39, which projects beside a hook 46, hung from a transverse bar $46^a$ in the frame, said hook being pressed toward the bar by a spring $46^b$, which when the finger is raised by the setting of the wiper-cam catches the finger and holds the latter and cam in position until the segments 22 are raised by the return of rock-shaft 19 to normal position, during which return movement of the shaft dog 36 engages the gear of the tens-disk and turns the latter one notch. Just before the handle 122 on rock-shaft 19 completes its return stroke there is brought into action an automatic releasing device for the carry-over cams, comprising a rod 56, which is secured to a rock-shaft 57 (which latter also serves as the support for the sleeve $45^a$) and has a rearward projection 58, which is engaged by a lever 59, (see Fig. 1,) pivoted upon a stud 60 on the side of the frame and having an arm 61, which projects up into the path of movement of a laterally-projecting pin 62 on one end of an arm 63, fast on the main rock-shaft 19. The rod 56 extends beneath pins 64, projecting from the hooks 46, and when elevated engages the pins and rocks said hooks on their pivots and against the tension of their springs, causing them to release the fingers 39, permitting the latter to drop by gravity, aided by springs, if desired, and retract the wiper-cams 40 out of the path of the pins 38. It will be understood that there is a similar arm, cam, and finger and coacting devices for carrying over from each disk of lower denomination to that of next higher denomination constructed and operating as described.

The several registering-disks 41 are mounted upon a shaft 42 and are free to turn thereon, and each drum has upon its perimeter two sets of numerals from "0" to "9," arranged in reverse order, as shown in Fig. 13, and each registering-disk has fixed to it and movable with it a gear 43, having ten teeth, and in addition the laterally-projecting pin 44 for the purpose of setting the wiper-cam 40 in position to act upon the pin 38 to throw its tooth into engagement with the gear, as above described.

The registering-disks are mounted in a carriage 47, which is adjustable laterally of the machine and can be held in adjusted position by means of a spring-latch 48, Fig. 5, engaging one of a series of slots 49 in the frame. The object of this lateral adjustment of the registering-disks is to put into and take out of action the desired indicator-drums in multiplying and dividing operations, as hereinafter described. Each gear is dogged by means of a spring-actuated device 50, which is held normally in engagement with the gear by its spring, then may be collectively disengaged from said gears by means of a rocking bar 51, (see Fig. 2,) having an arm 52 projecting therefrom into the path of a tripping-lever 53, (shown in detail in Fig. 10,) having a spring-controlled pawl 54, which may be thrown into position for engagement with a notch 55 in the periphery of disk 33 (before mentioned) on shaft 19. The pawl 54 has a finger 73, which is indirectly connected to the "total-key," as hereinafter explained, so that when said total-key is depressed the pawl 54 is actuated by disk 33.

*Repeating key connections.*—In certain calculations, as in multiplication, for example, it is sometimes desirable to repeat the same sum indicated by the keys successively a number of times, and to expedite such operations without necessitating resetting of the keys 7' at each operation I provide the "setting-key" 127, which is connected to arm 126, provided with a bail 125, which extends across the machine under the hooked ends of catch-levers 5 and in front of depending tails $15^a$ on dogs 15, (see Figs. 1 and 2,) and when key 127 is depressed and held down bail 125 is swung rearwardly and tilts the dogs 15, so that they are kept out of operative contact with pins 17 on levers 10. Consequently the levers 10 can be vibrated repeatedly by operating handle 122 without resetting the keys, because until dogs 15 are actuated by pins 17 on the return strokes of the levers 10, as above described, the bars 1 will remain in their locked positions. Thus any number may be "set" on the keyboard and repeated any number of times without resetting the numeral-keys by holding key 127 down.

This key may be provided with suitable detents to hold it in raised or lowered position at will of the operator.

*The error-key.*—If the operator should make an error in "setting" the keys by depressing the wrong key, he can release the keys and reset them without having to operate the handle 122 by means of an error-key 75, which is arranged at one side of the machine and is connected to an arm 71 on the rock-shaft 6, upon which the catch-levers 5 are pivoted. Attached to said shaft 6 is a bail 74, which extends up beside and in rear of the upper arms of catch-levers 5, and when key 75 is depressed bail 74 engages these arms and rocks levers 5, so as to force bars 1 forwardly, and thus release any depressed keys, which can thereafter be reset. The arm 71 is normally upheld by a suitable spring, such as shown at $71^a$, Fig. 2.

Figure 3:
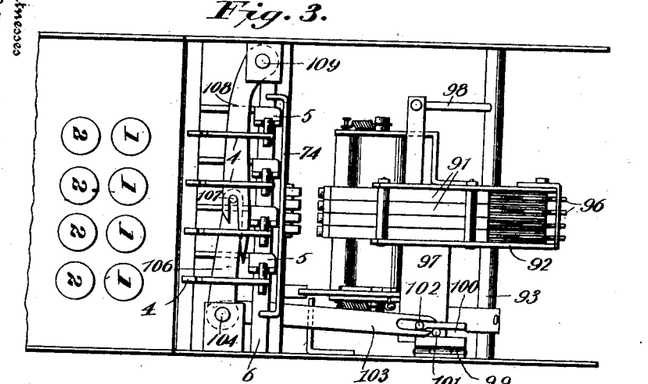
Fig. 3 is a top plan view of part of the printing mechanism.
Figure 4:
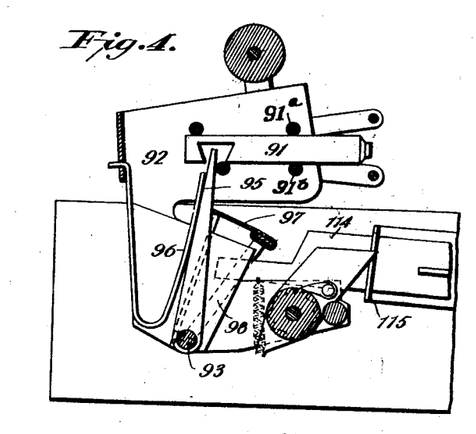
Fig. 4 is a reversed detail sectional elevation of part of the printing mechanism.
Figure 6:
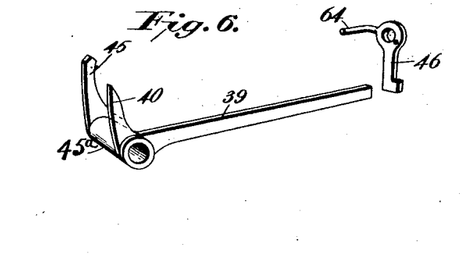
Figs. 6, 7, 8, 9, 10, 11, and 12 are detail perspective views of different elements of the machine.

*The recording or printing mechanism*—The printing mechanism comprises a series of type-bars 88, each carried on the rearwardly-extending lower end 89 of a lever 10 and guided in slots in a guide-bar 90, so that the said type-bars will be moved coincidently with the movement of the levers 10 to present for impression the type corresponding with the symbol of the key depressed. As many printing-hammers 91 are used as there are type-bars in the machine, and these hammers are mounted in a frame 92, which is pivoted upon a shaft or spindle 93, so as to be capable of being tilted away from the type-bars in adjusting paper, &c. As shown in detail in Fig. 4, there is an actuating-lever 95 and spring 96 for each hammer 91, which normally tends to project the hammer forwardly. Each hammer is suitably mounted and guided upon bars or antifriction-rollers $91^a$ $91^b$ or otherwise, (see Fig. 4,) and each has an elongated notch-engaging lever 95, so as to permit the rebound of the hammer to withdraw it from and prevent smirching of the paper. The hammers are cocked by means of a plate 97, slidably mounted upon the top bar of a U-shaped frame 98 on the shaft 93. This plate 97 is moved longitudinally across the path of movement of the hammers by a swinging lever 99, having a slot 100, which engages a pin 101 on the plate 97, (see Fig. 3,) and the swinging lever is provided with a pin 102, which is engaged by an arm 103 on a vertical shaft 104, normally impelled by a spring 105 (see Fig. 1) to withdraw the sliding plate 97 from before the hammers. On shaft 104 is an arm 106, provided with a pin 107, engaging a notch in an arm 108, pivoted to a rocker-shaft 109 (see Fig. 3) at the opposite side of the machine. The said arm 108 projects across the path of movement of the upper ends of rock-levers 5, and hence when said rock-levers 5 are moved by the depression of a key the arm 108 will be pushed inwardly by said catch-lever 5, (differential distances in proportion to the distance of 5 from pivot 109,) and consequently the shifting arm 106 will be moved, and it will in turn rock shaft 104, and the motion of the latter will be transmitted through arm 103 to the sliding plate 107 and said plate moved in front of the hammer or hammers to be cocked. The shaft 19 is then given a quarter-turn forwardly, which permits the lever or levers 10 to shift the printing bar or bars into position to be acted upon by the hammers, and by a further movement of shaft 19 in the same direction the wiper-cams 18 are turned over until a pin 110, projecting from the outermost one of said cams, comes into contact with a tripping-dog 111 on a lever 112, (see Fig. 1,) pivoted on the shaft 11 and having a slot in its lower end engaging a pin 113 on a push-bar 114, mounted in bearings 115, said bar 114 being adapted to engage the frame 98, carrying the sliding plate 97, and move said frame and plate rearwardly, causing the plate 97 to cock the hammers 91 opposite the appropriate type-bar set by the depression of the key or keys, and when this has been done the push-bar 114 and hammers are retained in such position by a pressed catch-lever 116, as shown in Figs. 1 and 2. The push-bar 114 is provided with a spring 117 for normally retracting it. The extreme forward movement of the slide 114 is accomplished when the shaft 19 has made about a half-revolution forward, (the complete movement of the shaft 19 in either direction being about three-quarters of a revolution.) When the movement of the shaft is reversed, a pin 118 on the longer end of the arm 63 strikes a spring-trip 119 on the catch-lever 116 and disengages said catch from slide 114, which is immediately retracted by its spring, thus releasing the plate 97, and the hammers are forcibly propelled into contact with the type-carriers by their springs 96 and the printing effected.

The trip 119 (see Figs. 9 and 20) is pivoted to lever 116, so that it can yield as arm 63 moves in one direction, but when the arm returns trip 119 locks to the lever and the arm in forcing the trip out of its path vibrates the lever as described.

The paper mechanism (indicated by the drums 84 and 85 and web 86) may be of the usual character, as also may be the inking-ribbon 87 and its feed and controlling mechanism, which are not claimed herein.

*The total-key connections.*—If at any time it is desired to ascertain the total registered on the machine the key 75 is used as follows: When key 75 is depressed as a total-key, arm 74 is used for the purpose of rocking the rock-levers 5 downwardly in order to carry their hook ends 14 below the pins 17 on levers 10, so that said levers are free to fall forward in making the total, which operation will presently be described. The lever 71 is also connected with the upper bent end of a slide 76, which is attached to the face of lever 30, (see Figs. 2 and 14,) and this slide in turn has a notch 77, which engages the tailpiece of a latch 34 on the lever 30, and when the slide is depressed will release said latch from engagement with the pins 32 or 32ª, (see Figs. 16 and 17,) and the slide 76 has in addition fitted to it a spring dogging device 78, which when the key 75 is depressed is thrown into the path of movement of the pin 55 on the disk 33 in order to effect a rearward movement of the guide-plate 24 for the segments 22, so as to move such segments out of engagement with the gears of the indicator-drums, said pin 55 engaging device 78 and forcing lever 30 forward as handle 122 is moved backward.

Figures 25, 26, 27, 28, 29:
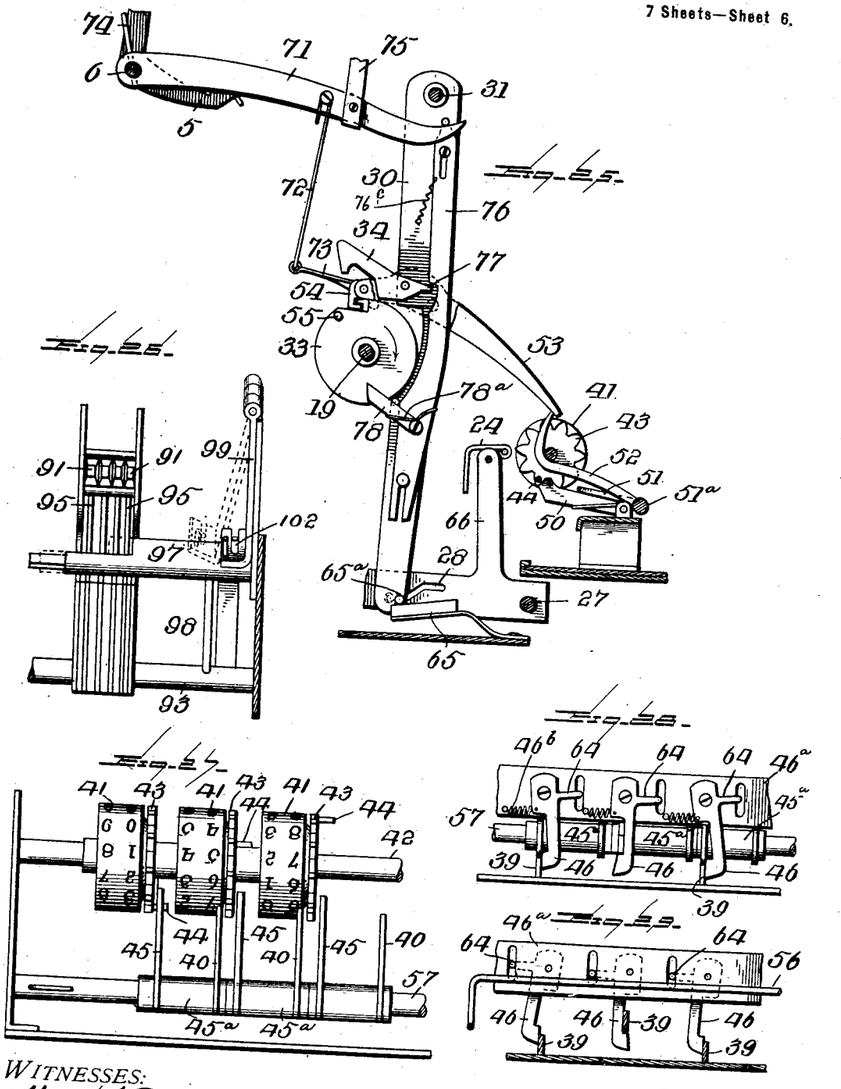
Figures 26, 27, 28, 29:
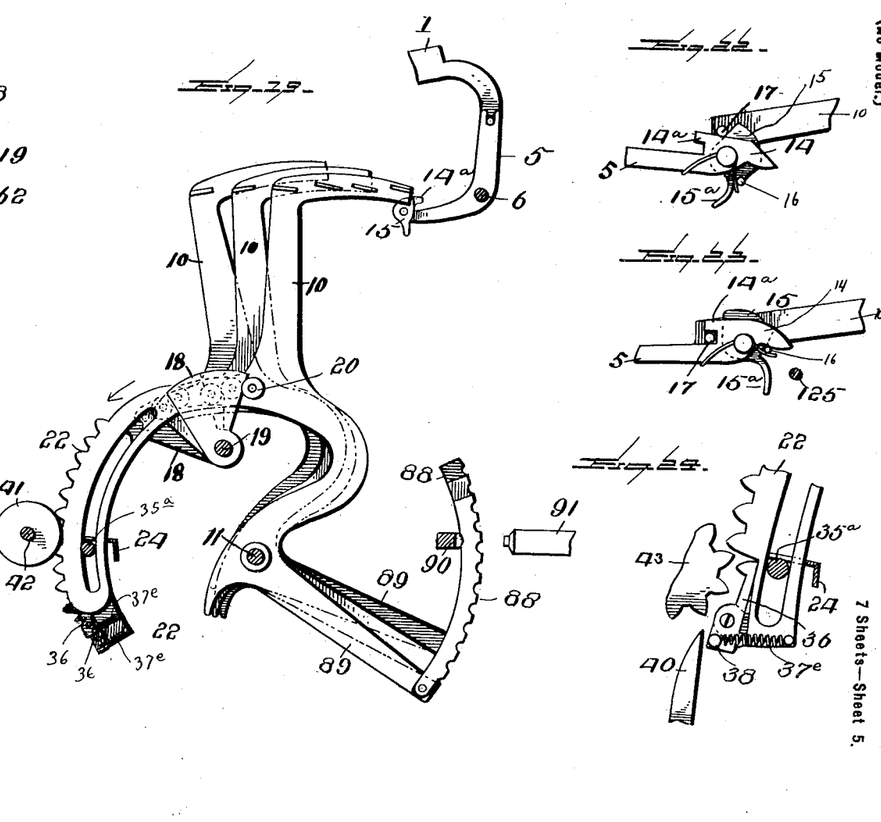

The spring 71ª, Fig. 2, normally elevates the lever 71, and consequently the slide 76, and hence when said lever 71 is depressed by the key 75 the slide 76 is free to descend, or may be positively caused to descend by a suitable spring 76ᶜ, Fig. 25, or other device. As said slide 76 descends its notch 77 engages the tail of the latch 34 and tilts it out of the path of movement of the pins 32 and 32ª on disk 33, (see Fig. 25,) but throws the device 78 into the path of movement of the pin 55, and hence the lever 30 is acted upon by said pin 55 through latch 78 to vibrate the lever 30, and consequently vibrate the plate 24.

A guide-plate 79, slotted to receive and guide the main vibrating levers 10, may be employed. (See Fig. 1.)

In order to reset the registering-disks, it is desirable to disengage the pawls 50 therefrom, and for this purpose I provide a bail 51, overlying the pawls 50 and attached to a rock-shaft 51ª, having an arm 52, which is curved upwardly and inwardly in position to be engaged by one end of a pivoted lever 53, pivoted on the side of the casing, (see Figs. 1 and 30,) the other end of which is provided with a pivoted spring-held trip 54, which is provided with an arm 73, connected by a rod 72 to the arm 71, so that when key 75 is depressed the trip 54 is thrown into position to engage a notch 33ª in disk 33, and as the handle 122 is moved forward, so as to oscillate lever 53, causing it to rock shaft 51ª and cause bail 51 to disengage the pawls 50 from the register-wheel gears.

*The indicator mechanism.*—An indicator mechanism comprising as many indicator-drums 80 as there are registering-disks is mounted in carriage 47. The object of this indicator mechanism is to show the number of movements of the shaft 19—that is to say, complete strokes of the handle 122 when the register-wheels are laterally shifted, as hereinafter explained. Each drum is provided with a gear 81, (see Figs. 1 and 5,) dogged by a spring-dog 82, (see Fig. 1,) and each drum as the movement of the carriage brings it into position is actuated step by step or tooth by tooth by means of a spring-retracted pusher 83, mounted in suitable bearings in the machine-framing and actuated by a pin 62 on arm 63 at each movement of shaft 19.

If desired, a friction-spring 65 (see Figs. 1 and 2) or other suitable detent may be used to act against a pin 65ª or the end of the lever 30 in order to hold the said lever against accidental displacement in the vibration of the rack-bar carrier. Also, if desired, a series of fingers 66 may be used to cooperate with the levers 39 and the gears of the registering-wheels to insure the proper alinement of the printing-bars in printing totals. These fingers may be mounted upon arms 67, pivoted to a shaft 68, having an arm 69, connected by a rod 70 with lever 71, as shown in Fig. 2.

The mechanism will be suitably inclosed, and, as shown at 120, a casing may be placed over the registering-wheels having sight-openings covered by a perforated slide 121, (see Figs. 1 and 15,) the perforations in said slide being of a size to expose only one numeral on each wheel at a time, so that by movement of the slide to the right or left only the desired line of numerals will be exposed, while the adjacent line will be covered. The indicator-drums 80 also may be similarly covered.

The shaft 19 has applied to it externally of the machine a crank, handle, or other operating device 122. (Shown in dotted lines in Figs. 1 and 2.) The handle and shaft 19 move through an arc of about two hundred and seventy degrees, this movement being limited in the forward direction (to set the mechanism) by a stop-pin 123 and in the reverse direction (to effect the registering and printing) by a stop-pin 124.

It is desirable in order to avoid interference with other parts of the machine that the registering-wheel carriage 47 be locked against movement excepting when the handle 122 is in the position indicated in Fig. 2, and hence I interpose a latch 130, (see Fig. 1,) engaging alined notches in the carriage and its platform and pivoted at 131 and actuated by a pin 132 on arm 26 engaging a slot 133 in the latch 130. This locking device is intended to prevent sliding of carriage except when handle 122 is in forward position, at which time the segments 22 are tilted back away from the disks 14, thus allowing said disks to pass freely in front of segments when latch 48 is depressed.

Operations.

Having thus described the various mechanical features and constructions of parts and incidentally their operations, I will briefly explain the manner of using the machine in various arithmetical calculations for which it is adapted.

*Multiplication.*—In order to multiply, it is necessary to depress keys corresponding to the figure to be multiplied. For example, if the sum were four hundred and thirty-two to be multiplied by twenty-four the "4" key in the hundreds-column would be depressed, and then the "3" key in the tens-column and the "2" key in the units-column, and then the repeating-key is depressed. By the depression of the repeating-key 127 the depressed numeral-keys will be retained in their depressed condition and restrained from release. The handle is then given four full strokes, which will reciprocate the levers 10 four times and result in accumulating on the registering-wheels four hundred and thirty-two four times, or, in other words, multiplying that sum by four. The handle 122 is then given a full forward movement and left there as in Fig. 2. This operation will result in partially unlocking the registering-wheel carriage 47 and also throw out of gear the segments 22, so that the carriage can be moved in front of the latter by manipulation of the lever 48 and a lateral movement of the carriage, and in this movement the segment corresponding to the units will be in position to engage the gear of the tens register-wheel. The handle is then returned to normal lower position, completing its full stroke, and is then given a second full stroke, and the result indicated on the registering-wheels will correspond to multiplying by twenty, and since the multiplication by four units has been previously effected and noted the two operations will result in accumulating on the registering-wheels the product of the sum. At the same time the reading on the drums 80 will be twenty-four, indicating that the handle has been properly operated, since said drums are actuated as described by actuation of shaft 19. In multiplying and dividing the paper should be swung back away from the type, so that no printing is done during multiplying or dividing operations; but the totals may be printed after such operations are completed. If it be desired to print the answer, the keys that are down are first released, and then the handle is given its forward stroke and left there, and the indicator-carriage is brought into normal position. The handle is then returned to its normal position, and the total-key 75 is depressed and a complete stroke of the handle made. The product will then be printed on the slip, and the machine cleared and ready for another transaction, zero appearing on all the registering-disks at all of the sight-openings.

*Division.*—To divide, the machine is first brought to zero, and then the sum to be divided is put on the registering-wheels as follows: If, for example, six hundred and thirty-two is to be divided by twenty-four, the "3" key in the third column is depressed and the "6" key in the second column and the "7" key in the first column, using that key whose number added to the number to be put on the drum will make nine. Then all of the nine keys remaining to the left of the depressed keys are pressed down, and one complete stroke of the handle 122 is made, and this operation will put the sum on the registering-wheels and also move the carrying-pins 44 into proper position for all minus operations. The sight-opening slide is then shifted to the right, which will expose to view the other set of figures on the registering-wheels, and "632" will show in the sight-openings. Then "24" is set on the keyboard, as in adding, and the repeating-key 127 is depressed, so as to prevent the release of the keys expressing twenty-four until the operation is completed. Then the handle 122 is turned forward, as in Fig. 2, and left there, and the registering-wheel carriage is shifted to the right, thus taking out of action the units registering-wheel, and hence "63" on the registering-wheel will come under the "24" on the keyboard, and in this way the segments 22, corresponding to the depressed numeral-keys 2 and 4, will be in position to engage the gears on the registering-wheels indicating the number "63." The handle 122 is then returned to normal position, thereby completing one reciprocation, and "392" will appear in the sight-openings. Since the "39" of "392" is greater than the "24," the handle 122 is given one more full reciprocation, resulting in "152" appearing in the sight-openings, and since the "15" of "152" is less than twenty-four the registering-wheel carriage is moved one notch to the left, and this is permitted by moving the handle 122 forward a half-stroke and releasing the lever 48. These movements will result in bringing the registering-wheel containing "52" under the "24" keys in position to have their gears engaged by the segments 22. The handle 122 is now returned to normal position, and "128" will show in the sight-openings. Since one hundred and twenty-eight is greater than twenty-four, the operation of the handle 122 is continued as long as the amount in the sight-openings is greater than twenty-four, and in the example in question five more full strokes of the handle will be required, and then "8" will show in the sight-openings, same being the remainder. The upper drums will show the quotient and the depressed keys will show the divisor.

*Subtraction.*—To subtract, first put the minuend on the drums by depressing the numeral-keys, as for dividing. For example, to subtract twenty-four from six hundred and thirty-two the "3" key in the third column, the "6" key in the second column, and the "7" key in the first column of keys are depressed, and also all of the nine keys in the columns to the left of the depressed keys. To get carrying-pins 44 in position for minus operation, the handle 122 is given one full reciprocation, and this will put "632" on the registering-wheels. The sight-opening slide is also moved to the right to bring the minus set of figures into view. The number to be subtracted is then put on the keyboard same as for adding, and the handle is reciprocated once, and the answer will appear at the sight-openings.

The reason for depressing "2" in order to have "7" show in the sight-opening in all minus operations is because the drums always move in the same direction, and the drum in the plus-column reads from "0" to "9," while in the minus-column the figures on the drum read from "9" to "0," and consequently if "7" is to appear in the minus sight-opening the "2" key (whose "2" on the plus-column is opposite the "7" on the minus-column of figures on the registering-wheel) must be pressed, and this results in advancing the drums two teeth when the handle is operated, and since the "7" on the minus-column travels with it it will appear in the minus sight-opening. The reason the zeros are not opposite each other is found in the fact that the pin 44, which effects or causes the carrying to be done when the amount on the drum becomes greater than nine, acts only when the roller advances to the tenth tooth in all plus operations, whereas in all minus operations the pin must act promptly at the beginning of the movement of the drum, and consequently it must be advanced nine teeth, which will bring it into position to act as soon as the drums are advanced one or more teeth.

To print the total, the segments are left in gear during the forward movement of levers 10, thus rotating the registering-wheels backwardly until pins 44 in gears 43 stop against tripping-finger 45, when the registering-wheels will stand at "0" and the proper type will be presented for printing.

When using the machine for purposes of addition, a key is depressed in each row to correspond with the figures of the item, and then the handle is moved one full stroke, resulting in the restoration of all of the depressed keys to their normal position and the printing of the corresponding figures on the slip and the accumulation thereof on the indicator-drums. This operation is repeated until every item is added. When the total is to be printed, the total-key is first depressed and held down during the complete stroke of the handle. This operation will also clear the machine and restore the indicator-drum to zero. If it be desired to leave the total in the machine to be carried into another transaction, the same operation is repeated, excepting that the total-key is released at the end of the forward movement of the handle and before the handle is returned to normal position.

Of course the machine by obvious changes may be adapted for calculating money transactions in systems other than dollars and cents.

Having thus described the best means in which I have at this time contemplated applying and embodying my invention, I do not limit my invention to the details of construction; but

What I do claim as new, and desire to protect by Letters Patent thereon, is—

1. In a registering mechanism, the combination of registering-wheels, vibrating segments adapted to engage and actuate the registering-wheels, keys and connections for regulating the movement of said segments, means for returning the segments to normal position, a slotted guide-plate for said segments and means for moving said plate to and from the registering-wheels, substantially as described.

2. In a registering mechanism, the combination of registering-wheels, vibrating levers, segments connected therewith adapted to engage and actuate the registering-wheels, keys and connections for regulating the movement of said levers, a rock-shaft and cams for returning the levers to normal position, a slotted guide-plate for said segments and means for moving said plate to and from the registering-wheels, substantially as described.

3. In a registering mechanism, the combination of registering-wheels, segments adapted to engage therewith, means for reciprocating said segments, movable teeth on the segments and means for throwing said teeth into operative position to effect a "carrying over" from a wheel of lower to one of higher denomination, substantially as described.

4. In a registering mechanism, the combination of registering-wheels, vibrating segments adapted to engage therewith, vibrating levers and connections for reciprocating said segments, and a movable tooth pivoted to each segment of higher denomination, with means actuated by the adjacent registering-wheel of lower denomination for throwing said teeth into operative position, substantially as described.

5. In combination, registering-wheels, vibrating or reciprocating segments adapted to engage therewith, and means for reciprocating said segments; movable auxiliary teeth on the segments, and cams adapted to be actuated by registering-wheels of lower denomination, so as to cause the movable teeth of the segments of higher denomination to come into operation, substantially as described.

6. In combination, registering-wheels, swinging and reciprocating segments adapted to engage therewith, and vibrating key-controlled levers for reciprocating said segments; with movable auxiliary teeth on the segments, and cams adapted to be actuated by registering-wheels of lower denomination to cause the movable teeth of the segments of higher denomination to come into operation and effect the "carrying over," substantially as described.

7. In combination, registering-wheels, reciprocating segments adapted to engage therewith, and means for operating said segments; spring-retracted teeth on the lower ends of the segments, wiper-cams beside the disks adapted to engage the teeth and throw them into operative position, and means for setting the cam of a disk of higher denomination by and from the disk of lower denomination, substantially as described.

8. In combination, sliding bars, keys for shifting said bars, vibrating levers adapted to be limited in their movements by said keys, and rocking levers actuated by said bars having hooked ends adapted to be engaged by pins on the vibrating levers to restrain movement of the latter unless the corresponding bar has been shifted, substantially as described.

9. In combination, sliding bars, keys for shifting said bars, vibrating levers adapted to be limited in their movements by said keys, rocking levers actuated by said bars having hooked ends adapted to be engaged by pins on the vibrating levers, to restrain movement of the latter unless the corresponding bar has been shifted, and trip latches or dogs on the hooked ends of the rock-levers adapted to be engaged by the released levers as the latter are returned to normal position and thereby cause the resetting of the bar and keys, substantially as described.

10. In combination, the registering-wheels, reciprocating segments adapted to actuate the registering-wheels, vibrating levers for operating said segments, keys for controlling the movement of said vibrating levers, and a rock-shaft and connections for positively actuating said levers; with a movable slotted guide-plate for the segments adapted to hold them in or out of engagement with the registering-wheels, and means for periodically actuating the guide-plate from the rock-shaft, substantially as described.

11. In combination, the registering-wheels, segments adapted to actuate the registering-wheels, vibrating levers for operating said segments, keys for controlling the movements of said vibrating levers, and a rock-shaft and connections for positively actuating said levers; with a movable guide-plate for the segments adapted to hold them in or out of engagement with the registering-wheels, a swinging lever, connections between the free end of said lever and the plate, a disk on the shaft, and means for periodically actuating the swinging lever from the shaft, substantially as described.

12. In combination, a series of numeral-keys, sliding bars actuated thereby, type-hammers, and a laterally-adjustable device for cocking said hammers; with means whereby said sliding bars effect the shifting of said plate so that only the proper hammers are cocked.

13. In combination, a series of numeral-keys, sliding bars actuated thereby, type-hammers, their actuating-levers, and a laterally-adjustable device engaging said levers to cock said hammers; with an arm adapted to be actuated by said sliding bars, a vibrating lever operating said slide, and connections between said arm and lever, whereby when a slide-bar is shifted, the corresponding type-hammer is cocked, substantially as described.

14. The combination of registering-wheels, reciprocating segments adapted to mesh therewith, a rocking guide for said segments, and a rock-shaft; with a swinging lever beside said shaft having its lower end connected with the guide, and means for swinging said lever by the rocking of the shaft, substantially as described.

15. The combination of the registering-wheels, the reciprocating segments adapted to mesh therewith, a rocking guide for said segments, and a rock-shaft; with a swinging lever beside said shaft having its lower end connected with the guide so as to shift the latter; and means for swinging said lever by the rocking of the shaft, said means comprising a latch pivoted on the lever, and a disk on the shaft having two pins adapted to alternately engage the latch, substantially as described.

16. In combination, the registering-wheels, reciprocating segments adapted to mesh therewith, a guide for said segments, a rock-shaft, a swinging lever for rocking said guide, so as to normally hold the segments and registering-wheels in mesh during the registering motion of the rock-shaft, and means for actuating said lever from said shaft; with a key and connections whereby upon depression of said key the guide is caused to move the segments out of mesh during the normally registering motion of the rock-shaft.

17. In combination, the registering-wheels, reciprocating segments adapted to mesh therewith, a guide for said segments, and dogs for locking the registering-wheels, a rock-shaft, a swinging lever for rocking said guide, so as to normally hold the segments and registering-wheels out of mesh during the forward or setting motion of the rock-shaft, and means for actuating said lever from said shaft; with a key and connections whereby upon depression of said key the guide is caused to hold the segments in mesh during the forward or "setting" motion of the rock-shaft, and the dogs disengaged from the registering-wheels.

18. In combination, the registering-wheels, reciprocating segments adapted to mesh therewith, a guide for said segments, a rock-shaft, a swinging lever for rocking said guide, so as to normally hold the segments and registering-wheels out of mesh during the "setting" motion of the rock-shaft, and in mesh during the return motion thereof, and means for actuating said lever from said shaft; with a key and connections whereby the guide is caused to hold the segments in mesh during the "setting" motion of the rock-shaft, and out of mesh during the return motion thereof, said connections comprising a slide on the swinging lever, a spring-pressed pawl thereon, and a disk on the shaft adapted to engage said pawl when the key is depressed, substantially as described.

19. In combination, the registering-wheels, reciprocating segments adapted to mesh therewith, a guide for said segments, a rock-shaft, a swinging lever for rocking said guide, so as to normally hold the segments and registering-wheels in mesh during the registering motion of the rock-shaft, and out of mesh during the "setting" movement of said shaft, and means for actuating said lever from said shaft; with a key and connection whereby the guide is caused to hold the segments in mesh during the setting stroke and to move the segments out of mesh during the return or registering motion of the rock-shaft, said connections comprising a slide on the swinging lever, a spring-pressed pawl thereon, and a disk on the shaft adapted to engage said pawl when the key is depressed, a rock-lever having a tripping-pawl also engaging said disk when the key is depressed, and dog-releasing devices operated by said rock-lever, substantially as described.

20. In an adding-machine, the combination of a series of laterally-adjustable registering-wheels, a series of corresponding indicator-wheels adjustable with the registering-wheels, mechanism for operating the registering-wheels, and a rock-shaft and connections for operating said mechanism; with a single reciprocating device adapted to engage and actuate the proper indicator-wheel when the rock-shaft is operated, whereby the displacement of the registering mechanism, and the number of operations of the rock-shaft during such displacement is indicated, substantially as described.

21. In an adding-machine, the combination of a series of laterally-adjustable registering-wheels, a series of corresponding indicator-wheels adjustable with the registering-wheels, mechanism for operating the registering-wheels, a rock-shaft and connections for operating said mechanism, and means for actuating the proper indicator-wheel when the rock-shaft is operated, said means comprising a single sliding spring-retracted bar adapted to engage a gear on the opposed indicator-wheel, and an arm on the shaft engaging and actuating said bar, whereby the displacements of the registering mechanism, and the number of operations of the rock-shaft during the displacement are indicated, substantially as described.

22. In a calculating-machine, a keyboard provided with a series of keys, a main vibrating lever for each series of keys provided with stops coöperating with said keys to set the lever at the desired point, each lever having a toothed rack-segment, a series of registering-wheels provided with gears coacting with the segments, a rocking plate in which the segments are guided, means for rocking said plate, and a crank-shaft provided with means for actuating the said lever, each segment excepting the first or unit segment having an extra movable tooth normally idle, and means for moving said movable tooth into operative position.

23. In a calculating-machine, a keyboard having a series of keys, sliding bars corresponding in number with the series of keys, and rocking catch-levers corresponding in number with the series of bars and connected thereto, and having hooked lower ends; combined with a series of vibrating levers provided with stops to limit their range of movement in accordance with the depressed keys of the appropriate series, and also having pins to engage the hooked ends of the rock-levers, substantially as described.

24. In a calculating-machine, a keyboard having a series of keys, sliding bars corresponding in number with the series of keys, and rock-levers corresponding in number with the series of bars and jointed thereto, and having hooked ends provided with trip-latches or dogs; combined with a series of vibrating levers corresponding in number with the number of series of keys and provided with stops to limit their range of movement in accordance with the depressed keys of the appropriate series, and also having pins adapted to engage under the hooked ends of the catch-levers, and to engage the trip-latches of the rock-levers, and an independently-controlled bar for simultaneously throwing the various trip-latches out of operative position with relation to the vibrating levers, for the purpose and substantially as described.

25. In a calculating-machine, a keyboard having a series of keys, sliding bars corresponding in number with the series of keys, and rock-levers corresponding in number with the series of bars and jointed thereto, and having hooked ends provided with dogs or trip-latches; combined with a series of vibrating levers corresponding in number with the number of series of keys and provided with stops to limit their range of movement in accordance with the depressed keys of the appropriate series, and also having pins to engage the hooked ends and trip-latches of the rock-levers, and a bail or rod coöperating with the rock levers adapted to effect the disengagement of the keys and key-bars, substantially as described.

26. In a calculating-machine, a carriage containing registering-wheels having gears, spring-dogs normally engaging the gears of said wheels, a dog-releasing bar automatically controlled by means interposed between it and the setting mechanism, said automatic controlling means comprising a lever, a cam-disk on the main shaft of the machine, and a setting mechanism for placing said lever in operative relation to said cam-disk.

27. In a calculating-machine, a main shaft provided with a cam-disk, a rocking plate, reciprocating segments guided in said plate, registering-wheels actuated by said segments, vibrating levers for actuating said segments, keys for setting the said vibrating levers, a lever for rocking the said plate, and means for actuating said lever periodically from said cam-disk.

28. In a calculating-machine, a main shaft provided with a cam-disk, a rocking plate, segments guided in said plate, registering-wheels actuated by said segments, vibrating levers for actuating said segments, keys and connections for setting the said levers, a lever and connections for rocking the said plate, and means to connect said plate-rocking lever periodically with said cam-disk, substantially as described.

29. In a calculating-machine, a series of registering-wheels each having a laterally-projecting pin for carrying from one to the other, combined with levers normally standing in the path of movement of said pins, spring-latches adapted to engage said levers, and automatic means periodically actuated to release said latches.

30. In a calculating-machine, a setting mechanism including vibrating levers, and keys for limiting their movement; combined with printing-bars attached to said vibrating levers and operated thereby, printing-hammers, a slide for cocking said hammers, and a slide-actuating mechanism controlled by the vibrating-lever-setting mechanism.

31. In a calculating-machine, a setting mechanism including vibrating levers, and keys and connections for setting said levers, combined with printing-bars attached to said levers and operated thereby, printing-hammers, a slide for controlling the cocking of said hammers, a slide-actuating mechanism controlled by the lever-setting mechanism, and means for releasing the hammers to effect the impression.

32. In a calculating-machine, a printing mechanism comprising type-bars, vibrating levers and means to set the said levers, a main shaft and connections for actuating the said levers, an arm on said shaft, a rock-lever coacting with said arm, a push-bar actuated by said rock-lever, hammers, and a hammer selecting and cocking device, substantially as described.

33. In a calculating-machine, a printing mechanism comprising type-bars, vibrating levers connected therewith, means to set the said levers, and a main shaft for actuating the said levers, an arm on said shaft, a rock-lever coacting with said arm, a push-bar actuated by said rock-lever, spring-pressed hammers, and a hammer selecting and cocking device, substantially as described.

34. In a calculating-machine, a printing mechanism, comprising type-bars, main vibrating levers connected to said bars, means to set the said levers, and a main shaft for actuating the said levers; an arm on said shaft, a rock-lever coacting with said arm, a push-bar actuated by said rock-lever, spring-pressed hammers, a hammer selecting and cocking device, and a rocking support therefor actuated by said push-bar, substantially as described.

35. In a calculating-machine, a slidable carriage, a registering mechanism arranged therein, means to actuate said registering mechanism, including a handle, and a latch for locking said carriage against movement at all times, excepting at half-stroke of the operating-handle.

36. In a calculating-machine, a slidable carriage, registering-wheels mounted therein, and provided with gear-wheels, segments engaging said gear-wheels, a rocking guide for moving said segments into and out of engagement with the gear-wheels, means for locking the carriage against movements while the rack-bars are in engagement with the gear-wheels, actuated by the segment-carrier, and by said carrier released to permit the sliding of the carriage when the segments are withdrawn from engagement with the gear-wheels.

37. In a calculating-machine, an indicator mechanism comprising rotary drums, means to rotate said drums, a rocking guide for said means, and means to rock said guide comprising a lever, a disk on the main shaft, and a double-acting latch engaged at opposite ends alternately by said disk and thereby effecting a positive movement of the lever in both directions.

38. In a calculating-machine, an indicator mechanism, comprising rotary drums, means to rotate said drums, a rocking guide for said means, a swinging lever, a disk on the main shaft having laterally-projecting pins, and a double-acting latch on the lever engaged alternately by said pins, and thereby effecting a positive movement of the rocking lever in both directions, substantially as described.

39. In a calculating-machine, an indicator mechanism, comprising rotary drums, means to rotate said drums, a rocking guide for said means, a swinging lever, a disk on the main shaft having laterally-projecting pins, and a double-acting latch on the lever engaged alternately by said pins, and thereby effecting a positive movement of the rocking lever in both directions; with means to throw said latch out of engagement with said pins whenever it is desired to reset the registering-wheels to zero position or to print the total, substantially as described.

In testimony whereof I have hereunto set my hand this 17th day of December, A. D. 1901.

ALEXANDER C. SCHUMAN.

Witnesses:
 WM. H. FINCKEL,
 E. A. FINCKEL.